(12) United States Patent
Shemer et al.

(10) Patent No.: US 12,355,806 B2
(45) Date of Patent: *Jul. 8, 2025

(54) KUBERNETES SECURITY ISOLATION BASED ON CLASSIFIED INFORMATION AND RISK LEVELS

(71) Applicant: EMC IP Holding Company LLC, Hopkinton, MA (US)

(72) Inventors: Jehuda Shemer, Kfar Saba (IL); Stav Sapir, Beer Sheva (IL); Naor Radami, Shokeda (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/646,617

(22) Filed: Apr. 25, 2024

(65) Prior Publication Data
US 2024/0297894 A1 Sep. 5, 2024

Related U.S. Application Data

(63) Continuation of application No. 17/235,401, filed on Apr. 20, 2021, now Pat. No. 11,973,789.

(51) Int. Cl.
| | | |
|---|---|---|
| G06F 21/00 | (2013.01) | |
| G06F 9/455 | (2018.01) | |
| G06F 9/50 | (2006.01) | |
| G06F 21/53 | (2013.01) | |
| H04L 9/40 | (2022.01) | |

(52) U.S. Cl.
CPC ...... *H04L 63/1433* (2013.01); *G06F 9/45558* (2013.01); *G06F 9/5027* (2013.01); *G06F 21/53* (2013.01); *G06F 2009/45562* (2013.01); *G06F 2221/033* (2013.01)

(58) Field of Classification Search
CPC . H04L 63/1433; H04L 63/105; G06F 9/5027; G06F 9/45558; G06F 21/53; G06F 2009/45562; G06F 2221/033; G06F 9/5055
See application file for complete search history.

(56) References Cited

U.S. PATENT DOCUMENTS

| | | | | |
|---|---|---|---|---|
| 7,712,138 | B2 * | 5/2010 | Zobel | G06F 21/577 |
| | | | | 709/224 |
| 10,871,998 | B2 * | 12/2020 | Parees | G06F 9/505 |
| 10,944,691 | B1 * | 3/2021 | Raut | H04L 45/64 |
| 11,218,421 | B1 * | 1/2022 | Khan | H04L 41/122 |
| 2016/0147549 | A1 * | 5/2016 | Sivak | G06F 9/45558 |
| | | | | 718/1 |
| 2017/0374101 | A1 * | 12/2017 | Woolward | H04L 63/0263 |
| 2018/0139148 | A1 * | 5/2018 | Gamage | H04L 47/70 |
| 2020/0218798 | A1 * | 7/2020 | Kosaka | G06F 9/451 |
| 2020/0314204 | A1 * | 10/2020 | Gesswein | H04L 41/22 |

(Continued)

*Primary Examiner* — Don G Zhao
(74) *Attorney, Agent, or Firm* — Workman Nydegger

(57) ABSTRACT

One example method includes performing a filtering process that identifies one or more candidate hosts for scheduling of a pod, wherein the candidacy of a host is determined based in part upon an association rule, generating an overall host score for each of the candidate hosts, and scheduling the pod to one of the candidate hosts based on the overall host score of that candidate host. A host risk score and/or pod risk score may be used in the generating of the overall host score.

20 Claims, 4 Drawing Sheets

(56) References Cited

U.S. PATENT DOCUMENTS

| | | | |
|---|---|---|---|
| 2021/0089350 A1* | 3/2021 | Bezalel | G06F 11/3027 |
| 2021/0173710 A1* | 6/2021 | Crossley | G06F 9/45558 |
| 2021/0218652 A1* | 7/2021 | Raut | H04L 45/64 |
| 2021/0294651 A1* | 9/2021 | Misca | G06F 9/5061 |
| 2022/0046045 A1* | 2/2022 | Rao | G06F 21/577 |
| 2022/0188192 A1 | 6/2022 | Wang et al. | |
| 2022/0335119 A1* | 10/2022 | Kudo | G06F 21/604 |
| 2022/0337618 A1* | 10/2022 | Shemer | G06F 9/5027 |
| 2023/0259409 A1* | 8/2023 | Shi | G06F 9/5077 718/104 |
| 2024/0297894 A1* | 9/2024 | Shemer | H04L 63/105 |

\* cited by examiner

KUBERNETES SECURITY ISOLATION BASED ON CLASSIFIED INFORMATION AND RISK LEVELS

FIELD OF THE INVENTION

Embodiments of the present invention generally relate to container based infrastructures. More particularly, at least some embodiments of the invention relate to systems, hardware, software, computer-readable media, and methods for defining and implementing security measures in container based infrastructures.

BACKGROUND

Many organizations use data classification levels that are based on considerations such as the relative sensitivity of the data, and how and where the data is expected to be used. Example data classification levels might include 'public,' 'internal use only,' and 'restricted.' Defense organizations, in particular, have strict data classification levels that are used to control which users and systems that can access the data. Data classification levels used by defense organizations might include 'confidential,' 'secret,' and 'top secret.' As well, such organizations typically also enable, or prevent, access to data by specific groups, organizational functions, or ranks.

With the increase in the scale of applications, and the need for applications to share infrastructure to keep infrastructure costs under control, customers are looking for ways to provide controlled access to data at different classification levels on the same infrastructure. A significant concern however is that applications or containers running workloads with lower classification levels, and thus may be less invested in data protection, might be used by a bad actor as a way to access more highly classified systems and data. Typically, more highly classified applications will generally have better security measures in place than applications that are not as highly classified.

For example, a malicious attacker may use the possibly less secure, lower classified applications, as a way to attack more highly classified applications that may run on the same infrastructure as the lower classified applications. The attacker may use the wider attack surface, such as more open ports, less stringent privileges, more user traffic, and wider public exposure, to get a foothold on the host, and from there jump to a higher classified application. This circumstance could arise as between different applications, but also within an application such as, for example, a service that handles sensitive lockbox, secret management, or vault access as compared with public API access.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
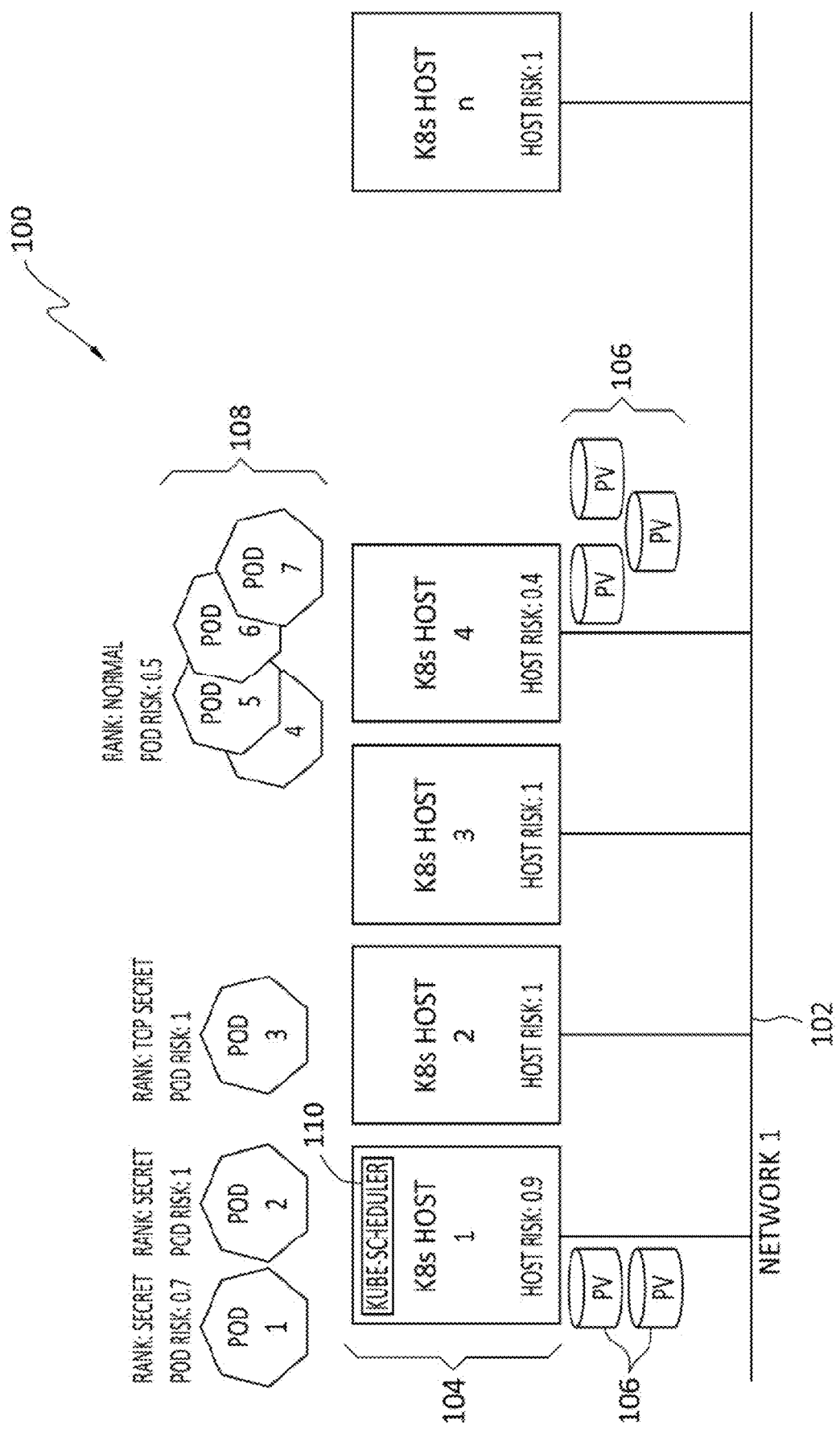
FIG. 1 discloses aspects of an example operating environment for some embodiments of the invention.

Embodiments of the present invention generally relate to container based infrastructures. More particularly, at least some embodiments of the invention relate to systems, hardware, software, computer-readable media, and methods for defining and implementing security measures in container based infrastructures.

In general, example embodiments of the invention may be employed in various operating environments, including container based computing environments which may present security concerns where different containers share the host kernel, and may also share access to other resources such as storage and memory for example. The scope of the invention is not limited to any particular operating environment however.

Some example embodiments are directed to methods that comprise designating a security classification rank, or simply 'rank,' such as 'confidential' or 'top secret' for example. The security classification may be assigned, for example, to data, an application, a service, a container, and/or, a pod. After the security classification has been assigned, a runtime isolation mode or isolation level, such as 'network isolated' for example, may be identified for the item to which the security classification has been assigned. After the runtime isolation mode has been identified, the relative respective security risk of each of one or more hosts may be ranked. As well, and before or after the relative respective security risk of the hosts has been ranked, the relative respective security risk of one or more pods may be ranked. Next, in this example method, one or more association rules may be used to connect the rankings, and their associated respective risks, with the runtime isolation modes. Finally, a scheduler or other entity may match a particular pod to a particular host, based on the security classification, runtime isolation mode, host risk, pod risk, and association rules. That is, the aforementioned information may be used to modify the scheduler scoring and filtering to match data/pod classification and host/pod risk, to isolation levels.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment may enable applications, services, and/or, data, to coexist and operate on the same infrastructure, notwithstanding that the applications, service, and data, may have different respective security requirements and constraints. As another example, an embodiment may enable a scheduler to assign, or schedule, a pod to a host best suited to meet the classification and security requirements of the pod.

It is noted that embodiments of the invention, whether claimed or not, cannot be performed, practically or otherwise, in the mind of a human. As indicated by the illustrative examples disclosed herein, embodiments of the invention are applicable to, and find practical usage in, environments in which tens, hundreds, or more, hosts service respective pods (sets of containers), which may number in the hundreds, thousands, or more. Such environments may be dynamic in nature, as containers and pods are added to, and removed from, the environment. Moreover, the security classification and isolation modes may vary from one pod to another, and may change over time. Processes such as the assignment of isolation modes and security classifications to pods, as well the evaluation of hosts to identify hosts best suited to meet the requirements of the pods, may be performed on an ongoing basis. Such processing is well beyond the mental capabilities of any human to perform practically, or otherwise. Thus, while simplistic examples are disclosed herein, those are for the purpose of illustration and to simplify the discussion. Accordingly, neither such examples, nor anything else herein, should be construed as teaching or suggesting that any aspect of any embodiment of the invention could or would be performed, practically or otherwise, in the mind of a human.

A. Overview

Example embodiments may be employed in any container-based infrastructure system, one example of which is Kubernetes, and are not constrained to use in any particular container-based infrastructure. Such embodiments may, but are not required to, take the form of a plugin to a scheduler, such as a Kubernetes scheduler for example. Other embodiments are in the form of a scheduler that may implement some or all of the disclosed functionality. While the following discussion refers to the particular example of the Kubernetes scheduler, it should be understood that the scope of the invention is not so limited and embodiments may be employed, more generally, with any scheduler of a container-based infrastructure.

In general, the Kubernetes (K8S) scheduler, sometimes referred to as 'kube-scheduler,' is a mechanism that decides what pod will run on what host, where a 'pod' refers to a set of containers, that is, a set of containerized applications. An environment may have tens, or even hundreds, of hosts each with different types and amounts of respective resources, examples of which include CPU, memory, connectivity, storage access, and load. It is the task of the scheduler to find the best place, that is, host, to run a pod.

A scheduler such as the kube-scheduler may perform at least two functions, namely, filtering and scoring. Filtering rules out any hosts that cannot run the pod for some reason, such as the host lacks the resources, access, or connectivity, to support the pod functions. To facilitate the filtering process, a 'standard criteria score' may be assigned to each host that reflects the relative extent to which the host includes the resources, access, or connectivity, for example, to support the pod functions. Thus, the standard criteria score may be based on physical traits of the host such as available resources and latency. The hosts that remain after the filtering process may be ranked relative to each other by an overall host score and the scheduler can then select the host with the highest host overall host score to run the pod. The scheduler may have a plugin mechanism and several tuning parameters that provide control over the operations of the scheduler. The scheduler may be affected by zones that group nodes together, for availability for example. In addition, there may be node affinity, pod affinity, and pod anti-affinity, that associate scheduling pods to nodes, or with other pods, or away from other pods. Finally, hosts can be tagged/labeled and scheduling of a pod to a host can take the tags into account when performing scheduling operations. Other K8S schedulers, or container schedulers, may have other parameters or functions. In general however, schedulers typically have some mechanism for controlling the way placement of a pod with a host is selected.

With the foregoing in view, example embodiments may involve the use of 'isolation levels' to the running of pods in a container-based infrastructure, such as Kubernetes. The isolation level may be tied to the data classification, and to applications, pods, and container host risk factors. Accordingly, embodiments of the invention may operate to control where a pod runs, and with what other pods, thus providing runtime environments that better match the sensitivity of the data and provide an initial layer of defense. This functionality may be implemented by, in some embodiments, adapting or constraining a scheduler, such as with a plugin mechanism for example, to place pods in the correct isolation level runtimes. Other embodiments are directed to a scheduler that may include the plugin mechanism. As the scale of applications and environments grows, the need for applications and services to safely coexist, such as on a common infrastructure, increases, and the definition and use of isolation levels may provide a framework that governs how this can be done safely.

B. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement and use a container-based infrastructure. Such a container-based infrastructure may be implemented in a cloud computing environment that may take the form of a public or private cloud computing environment, an on-premises computing environment, and hybrid computing environments that include public and private elements. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment. Computing environments, such as cloud computing environments, may use various systems and devices to provide various functions and services to one or more customers.

Devices in the operating environment may take the form of software, physical machines, or VMs (Virtual Machines), or any combination of these, though no particular device implementation or configuration is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

With particular attention now to FIG. 1, one example of an operating environment for some embodiments of the invention is denoted generally at 100. In general, the operating environment 100 may comprise a network 102 to which various hosts 104 may be connected. In some embodiments, one or more of the hosts 104 may be Kubernetes hosts, but that is not required. One or more PVs (Persistent Volumes) 106 may be attached to one or more of the hosts 104, but no host 104 necessarily requires a PV 106. One or more pods 108 may be assigned to a host 104. Any host 104 may, or may not, support a single pod 108 (see 'K8S host 2') or multiple pods 108 (see 'K8S host 4'). A host 104, such as 'K8S host 3' for example, may not support any pods 108. As also shown in FIG. 1, and discussed in more detail elsewhere herein, each of the hosts 104 may have assigned to it a risk level. The pods 108 may each have assigned to them both a rank, and a risk score, or pod risk. Finally, one or more of the hosts 104 may include a scheduler 110.

The scheduler 110 functionality may be implemented in various ways. For example, a scheduler may, or may not, be a plugin to the host 104. In particular, if an existing scheduler supports a plugin system, a plugin may be deployed that may be used to modify or replace an existing scoring system. Further, the scheduler 110 may be the 'kube-scheduler' but that is not required. In other embodiments, existing parameters of a scheduler may be modified to include and implement the disclosed functionality. Finally, some embodiments embrace a scheduler that may be used to completely replace an existing scheduler. The scope of the invention should not be construed as being limited to any particular form or implementation.

C. Aspects of Some Example Embodiments

Container-based infrastructures present security concerns in that different containers running on the same host may share the host kernel, and may also share access to host resources and/or to resources of an operating environment. Such other resources include, for example, storage, memory, and communications.

With this in mind, example embodiments of the invention may comprise or implement various elements and functions. Such elements and functions may include, but are not limited to: designating security classification rank; identifying runtime isolation modes; ranking host risk; ranking pod risk; and, association rules. Any or all of these elements and functions may be considered in filtering and scoring processes such as may be performed by a scheduler, and may also be considered in assigning a pod and/or application to a particular host.

Following are various elements that may be incorporated, in any combination, in one or more embodiments of the invention. These are presented by way of example and are not intended to limit the scope of the invention in any way.

Classification Rank. Metadata may be assigned to pods and applications to designate the security classification and rank, such as 'Top Secret' for example, of the pods and applications—note that assignment of a classification rank may not be required in every case and, for example, a default classification rank may be associated with a pod or application—in some example embodiments, the default classification rank may be 'minimal' or 'normal.'

Isolation Levels. An 'Isolation level' is a ranking of how a pod runs in relation to other hosts and other pods. Following is an example set of isolation levels that may be employed in some embodiments. Note that additional and/or alternative isolation levels may also be defined and implemented. Example set of isolation levels: Isolated Host—pod runs on its own host and does not share a kernel; Same App—pod runs on a host only with other pods from the same application; Same Rank—pod runs on a host only with other pods with the same security classification ranking; Same User—pod runs on a host only with pods from the same tenant, account or user; Minimum Rank—pod runs on a host only with other pods above security level ranking X; Network Isolated—pods cannot run on a host with pods with routing to an external network; Physical Host Isolated—On virtualized hosts, force a separate physical host; and, No restrictions.

Host Risk. Host risk, that is, a risk that a host may be susceptible to attack, may be assessed in some embodiments by considering various elements. Such elements may include, but are not limited to: open ports—the more open ports, the higher the susceptibility to attack; networking connectivity; Persistent Volumes (PVs) attached to the host—data in the PVs should be protected and backed up, but may be vulnerable to attack; host bios firmware version—if the firmware version is not up to date, the host may be relatively more susceptible to attack than if the firmware were up to date; and, host software version—if the software version is not up to date, the host may be relatively more susceptible to attack than if the software were up to date. Some or all of this information may be available, for example, from a host API (Application Program Interface) and definition files.

These elements may each be assigned a relative risk value, reflecting the relative extent to which they are determined to contribute to the susceptibility of the host to an attack. The various risk values may be summed together, or otherwise combined together in some way, such as through the use of weighting for example, to determine a host risk score. An example of a host risk score might be a value from 0 to 1, where 1 is most secure. The values need not necessarily be combined in any particular way, so long as they correlate to the relative risk. In some embodiments, the elements used to determine the host risk score may be weighted relative to each other. For example, having a number of open ports may be determined to be a relatively greater contributor to host risk than having a host bios firmware version that is not up to date. In this case, the risk value associated with the open ports may have a greater weight than the weight of the risk value associated with the out of date host bios firmware version.

Pod Risk. Pod risk, that is, a risk that a pod may be susceptible to attack, may be assessed in some embodiments by considering various elements. Such elements may include, but are not limited to: the number of pod open ports; the number of external ports; CPU and load statistics; type and number of networking assignments; PV needs; pod encryption, that is, whether or not the pod is encrypted; the type and version of software being run; whether or not security/virus/vulnerability scans are being performed, and the outcome of those scans; security measures—what security measures, if any, have been implemented to protect the pod; and, permissions and privileges—who has access to the pod, and what type of access do they have. In some embodiments, this information may be derived or obtained from the pod definition file, which may be in YAML, or by scanning the pods prior to running them, or during their runtime.

These elements may each be assigned a relative risk value, reflecting the relative extent to which they are determined to contribute to the susceptibility of the pod to an attack. The various risk values may be summed together to determine a pod risk score. An example of a pod risk score might be a value from 0 to 1, where 1 is most secure. The values need not necessarily be combined in any particular way, so long as they correlate to the relative risk. In some embodiments, the elements used to determine the pod risk score may be weighted relative to each other. For example, the number of open pod ports may be determined to be a relatively greater contributor to pod risk than networking assignments. In this case, the risk value associated with the open ports may have a greater weight than the weight of the risk value associated with the networking assignments.

Association Rules. In general, association rules include rules that connect, or associate, the various ranks, risks, and isolation levels, with each other. For example, and as disclosed herein, pods may be assigned to hosts based on the classification and security of the pods, and also based on the ability of the hosts to meet or support the classification requirements and security requirements of the pods. Through the use of isolation levels, any pod/host combination may coexist on the same infrastructure, which may be a container-based infrastructure, with any other pod/host combination, regardless of the particular security requirements or classification requirements of any pod, and also without regard to the risk level of any pod or host.

The association rules may be embodied, for example, as a text file that can be read and used to configure the scheduling logic by which a scheduler assigns pods to hosts. Association rules may be defined by a user, and/or by a computing system. Association rules may be added, modified, or deleted, at any time. Some example association rules include, but are not limited to: Top Secret (rank)→Isolated Host (isolation level); Secret (rank)→Same Rank (rank); Top secret (rank)→host risk=1 (risk); Top secret (rank)→another pod risk→0.9 (risk); Secret (rank)→Network Isolated (isolation level); and, Non-confidential or public (rank)→host risk=0 (risk).

Figure 2:
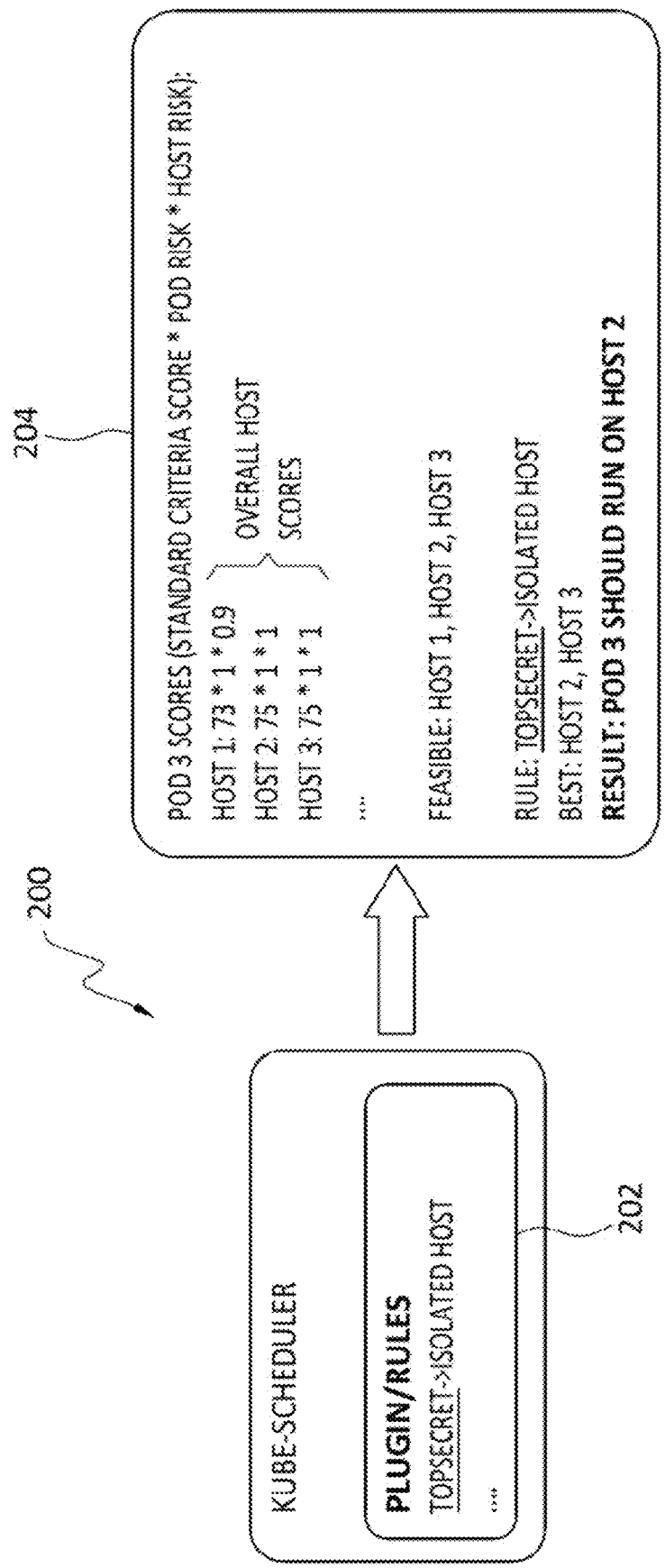
FIG. 2 discloses aspects of an example scheduler and associated operations.

With reference now to FIG. 2, a scheduler 200 according to some example embodiments may comprise a scheduling mechanism 202 which may take the form of a plugin to the scheduler 200. In other embodiments, the scheduling mechanism 202 may take the form of a set of affinity rules, such as the example in FIG. 2 'TopSecret→IsolatedHost.' The particular form of the scheduling mechanism 202 is not limited to the examples disclosed herein, and may depend on the form or type of the platform scheduler that will be used to make pod assignments.

The scheduling mechanism 202 may obtain, or be provided with, the isolation levels, and pod/host risks and pod/host ranks, and the scheduling mechanism 202 may use one or more association rules to match a pod to a host that meets not only the 'standard' criteria, such as an ability of the host to meet the memory and processing needs of the pod, but also meets the additional security constraints implied by the risk and/or rank of the pod. Relatively more stringent rules such as 'Isolated Host' may be implemented using a filtering mechanism of the scheduler 200. Host and pod risks may be used to affect the scoring mechanism, for example, by multiplying the standard criteria score by the pod risk score and the host risk score to generate an overall host score (standard criteria score*pod risk score*host risk score=overall host score). Together, these elements may be employed to provide scheduling that matches the rank to the isolation and risk levels, and reduces the risk of attack on classified information. The following example from FIG. 2 is illustrative, but not limiting of the scope of the invention.

FIG. 2 discloses aspects of an example scoring and filtering process 204 such as may be implemented in the fulfillment of one or more association rules applied by the scheduling mechanism 202. In this example, the applicable rule is that because Pod 3 has been designated as 'Top Secret,' it should be hosted on an isolated host, that is, a host that is not accessible by other pods or hosts. Thus, the task of the scheduling mechanism 202 in this example is to attempt to identify a host that includes not only the physical/software/virtual infrastructure that can support the Pod 3 functions but that also has an acceptable overall host score.

In the example of FIG. 2, performance of the filtering process has identified 3 different hosts with respective standard criteria scores of 73 or higher. Such results may have been obtained, for example, by specifying, as part of the filtering process, that only hosts with a standard criteria score greater than 70 would be retained for further consideration. With the filtering process completed by the scheduling mechanism 202, overall host scores may then be calculated for each of the remaining hosts. As shown, an overall host score may be calculated using: (standard criteria score*pod risk score*host risk score=overall host score). Thus, for Host 1, the overall host score is 65.7, for Host 2, the overall host score is 75, and for Host 3, the overall host score is 75. Given the constraints imposed by the rule, either Host 2 or Host 3 is acceptable to run Pod 3, and the choice of one or the other of those hosts may be arbitrary. Particularly, both Host 2 and Host 3 have a security level of 1.0, the maximum possible in this example, and are thus suited to host the 'TopSecret' Pod 3. Moreover, as noted above, Host 2 and Host 3 have been identified in the filtering process as possessing infrastructure adequate to support the operations of Pod 3. In view of these considerations, the scheduling mechanism 202 may then assign, or schedule, Pod 3 to either of Host 2 or Host 3, where the choice of Host 2 or Host 3 may be arbitrary if both are qualified to run Pod 3.

As illustrated by the example of FIG. 2, embodiments of the invention may operate to define security isolation and classification constraints which may then be used as a basis to schedule pods to hosts based on the pod classification and pod security requirements. Among other things, this approach may applications and services of varying constraints to coexist on shared infrastructure, such as a container based infrastructure in which multiple hosts may use the same physical and virtual computing resources.

D. Example Methods

Figure 3:
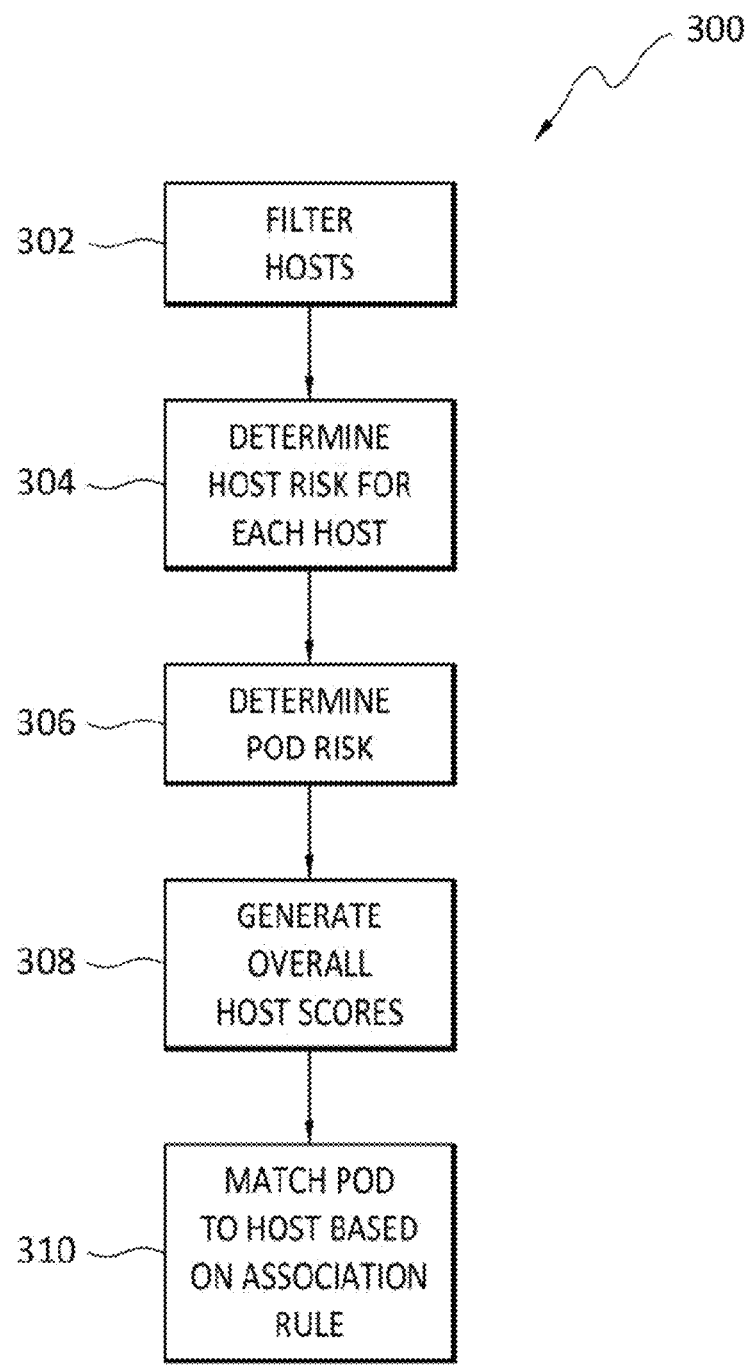
FIG. 3 discloses aspects of an example method for scheduling a pod to a host.

It is noted with respect to the example method of FIG. 3 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Directing attention now to FIG. 3, an example method 300 according to one or more embodiments is disclosed. The example method 300 may be performed in part, or in whole, by a scheduler, or a plugin to a scheduler. More generally however, no particular entity is required to perform the method 300, or any other method disclosed herein.

The method 300 may begin at 302 where a filtering process is performed that may identify candidate hosts to which a pod may be scheduled. A host risk score may be determined 304 for any hosts remaining after the filtering process 302. As well, a pod risk score may be determined 306 for the pod that is to be scheduled. Using the host risk score, pod risk score, and a respective standard criteria score for each candidate host, an overall host score may then be generated 308 for each candidate host. The candidate hosts may be ranked according to their respective overall host scores and the pod may be matched to a host 310 based on an overall host score and one or more association rules.

With respect to the method 300, and other disclosed methods, it is noted that it is not necessarily required that a host risk, pod risk, or rank, need be used to determine a pod assignment. For example, a pod assignment may be determined based on any one, or more, of rank, host risk, or pod risk.

E. Further Example Embodiments

Following are some further example embodiments of the invention. These are presented only by way of example and are not intended to limit the scope of the invention in any way.

Embodiment 1. A method, comprising the operations: performing a filtering process that identifies one or more candidate hosts for scheduling of a pod, wherein the candidacy of a host is determined based in part upon an association rule; generating an overall host score for each of the candidate hosts; and scheduling the pod to one of the candidate hosts based on the overall host score of that candidate host.

Embodiment 2. The method as recited in embodiment 1, wherein the association rule correlates a security rank of the pod with a required isolation level for the pod.

Embodiment 3. The method as recited in any of embodiments 1-2, wherein the candidacy of a host is further determined based in part upon a standard criteria score.

Embodiment 4. The method as recited in any of embodiments 1-3, further comprising determining a respective host risk score for each of the candidate hosts, and/or determining a pod risk score for the pod, and the overall host score is determined based in part on the host risk score and/or the pod risk score.

Embodiment 5. The method as recited in embodiment 4, wherein the overall host score is expressed as: standard criteria score*pod risk score*host risk score=overall host score.

Embodiment 6. The method as recited in embodiment 5, wherein the standard criteria score indicates an extent to which the host to which the standard criteria score applies has adequate hardware and software resources to support operations of the pod.

Embodiment 7. The method as recited in any of embodiments 1-6, wherein the host to which the pod is scheduled runs on an infrastructure that also supports another host with another pod, and a security rank of the pod is different from a security rank of the another pod.

Embodiment 8. The method as recited in embodiment 7, wherein an isolation level of the pod is different from an isolation level of the another pod.

Embodiment 9. The method as recited in any of embodiments 1-8, wherein the pod includes one or more containers, and the operations are performed in a container based infrastructure.

Embodiment 10. The method as recited in any of embodiments 1-9, wherein the operations are performed by a scheduler of a container-based infrastructure.

Embodiment 11. A method for performing any of the operations, methods, or processes, or any portion of any of these, disclosed herein.

Embodiment 12. A computer readable storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
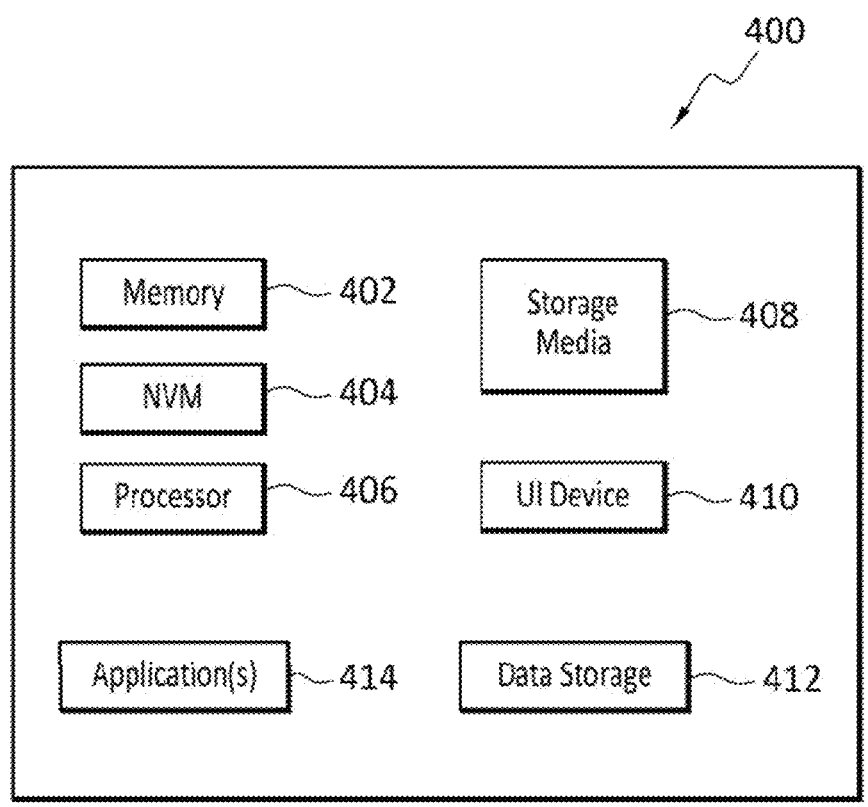
FIG. 4 discloses aspects of an example computing entity operable to perform any of the methods and operations disclosed herein.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
one or more hardware processors; and
a non-transitory computer readable storage medium having stored therein instructions that are executable by the one or more hardware processors to perform operations comprising:
performing a filtering process that identifies one or more candidate hosts for scheduling of a pod, wherein the candidacy of a host is determined based in part upon an association rule;
generating an overall host score for each of the candidate hosts; and
scheduling the pod to one of the candidate hosts based on the overall host score of the candidate host to which the pod was scheduled;
wherein the candidate host to which the pod is scheduled runs on an infrastructure that also supports another host with another pod, and a security classification rank of the pod is different from a security classification rank of the another pod.

2. The system as recited in claim 1, wherein the association rule correlates a security classification rank of the pod with a required isolation level for the pod.

3. The system as recited in claim 1, wherein the candidacy of the host is further determined based in part upon a standard criteria score.

4. The system as recited in claim 1, wherein the operations further comprise determining a respective host risk score for each of the candidate hosts, and/or determining a pod risk score for the pod, and the overall host score is determined based in part on the respective host risk scores and/or the pod risk score.

5. The system as recited in claim 4, wherein the overall host score is expressed as: overall host score=standard criteria score*pod risk score*host risk score.

6. The system as recited in claim 5, wherein the standard criteria score indicates an extent to which the host to which the standard criteria score applies has adequate hardware and software resources to support operations of the pod.

7. The system as recited in claim 1, wherein an isolation level of the pod is different from an isolation level of the another pod.

8. The system as recited in claim 1, wherein the pod includes one or more containers, and the operations are performed in a container based infrastructure.

9. The system as recited in claim 1, wherein the operations are performed by a scheduler of a container-based infrastructure.

10. A method, comprising:
performing a filtering process that identifies one or more candidate hosts for scheduling of a pod, wherein the candidacy of a host is determined based in part upon an association rule, and the pod has assigned to it a classification rank, an isolation level, and a pod risk score;
generating an overall host score for each of the candidate hosts, and each of the candidate hosts has a respective associated host risk score, which forms part of the overall host score, that indicates an extent to which the corresponding host is susceptible to an attack; and
scheduling the pod to one of the candidate hosts based on the overall host score of the candidate host to which the pod was scheduled;
wherein the candidate hosts run on a container-based infrastructure.

11. The method as recited in claim 10, wherein the filtering process eliminates any hosts that are unable to run the pod due to lack of resources, access, or connectivity.

12. The method as recited in claim 10, further comprising generating the pod risk score.

13. The method as recited in claim 10, wherein the overall host score for each of the candidate hosts is generated using the pod risk score, and also using a respective host risk score and a standard criteria score for the host.

14. The method as recited in claim 10, wherein the candidate hosts are ranked according to their respective host scores.

15. The method as recited in claim 10, wherein, to facilitate the filtering process, a standard criteria score is assigned to each host subjected to the filtering process, and the standard criteria score reflects a relative extent to which the host includes the resources, access, and/or, connectivity, to support functions of the pod.

16. The method as recited in claim 10, wherein the isolation level is a basis for determining where the pod will run, and with what other pods.

17. The method as recited in claim 10, wherein the isolation level comprises a ranking of how a pod runs, or is expected to run, in relation to hosts and other pods.

18. The method as recited in claim 10, wherein the classification rank comprises a security classification.

19. The method as recited in claim 10, wherein the pod is one of a group of pods ranked according to their respective risk, and the association rule connects rankings of the pods, and their respective security risk, with one or more runtime isolation modes.

20. The method as recited in claim 10, wherein the pod comprises a set of containerized applications.

* * * * *